United States Patent [19]

Korenberg

[11] Patent Number: 4,475,467
[45] Date of Patent: Oct. 9, 1984

[54] FLUIDIZED BED REACTOR UTILIZING A PLATE SUPPORT AND METHOD OF OPERATING THE REACTOR

[75] Inventor: Jakob Korenberg, York, Pa.

[73] Assignee: York-Shipley, Inc., York, Pa.

[21] Appl. No.: 348,249

[22] Filed: Feb. 12, 1982

[51] Int. Cl.³ .............................................. F23G 7/00
[52] U.S. Cl. .................................... 110/245; 432/58; 34/57 A
[58] Field of Search ................... 110/245, 347; 432/15, 432/58; 34/57 A, 57 E

[56] References Cited

U.S. PATENT DOCUMENTS

| | | | |
|---|---|---|---|
| 3,397,657 | 8/1968 | Tada | 110/245 |
| 3,540,388 | 11/1970 | Smith et al. | 110/8 |
| 3,550,916 | 12/1970 | Hoppe et al. | 34/57 A |
| 3,731,393 | 5/1973 | Okada et al. | 34/10 |
| 3,772,999 | 11/1973 | Miller, Jr. et al. | 110/8 |
| 3,776,150 | 12/1973 | Evans et al. | 110/8 |
| 4,023,280 | 5/1977 | Schora et al. | 34/10 |
| 4,062,656 | 12/1977 | Blaser et al. | 48/73 |
| 4,075,953 | 2/1978 | Sowards | 110/245 |
| 4,177,742 | 12/1979 | Uemura et al. | 110/245 |
| 4,227,488 | 10/1980 | Stewart et al. | 122/4 D |
| 4,259,088 | 3/1981 | Moss | 34/57 A |
| 4,303,023 | 12/1981 | Perkins et al. | 110/245 |
| 4,323,037 | 4/1982 | Meyer-Kahrweg | 34/57 A |
| 4,335,661 | 6/1982 | Stewart et al. | 110/245 |
| 4,372,228 | 2/1983 | Korenberg | 34/57 A |
| 4,397,102 | 8/1983 | Gamble et al. | 34/57 |

FOREIGN PATENT DOCUMENTS 53-118870 10/1978 Japan ........................... 110/245
1402543 8/1976 United Kingdom .

Primary Examiner—Henry C. Yuen
Attorney, Agent, or Firm—Finnegan, Henderson, Farabow, Garrett & Dunner

[57] ABSTRACT

A bed support, and a fluidizing bed reactor incorporating the bed support, the bed support including a horizontal support surface with a centrally disposed conduit for removing tramp material and/or agglomerated material from the reactor. The horizontal support surface has fluidizing air source jet nozzles for directing pressurized air toward the area above the conduit. In a first embodiment, the conduit has downwardly diverging walls. In a second embodiment, the horizontal support surface further includes a bar grate having central fluidizing air source jet nozzles positioned within the conduit. The method of operating the fluidized bed reactor includes directing pressurized air at an angle to the horizontal support surface both for fluidizing the bed and for moving the tramp material and/or agglomerated material toward the conduit for removal from the reactor through the conduit.

20 Claims, 9 Drawing Figures

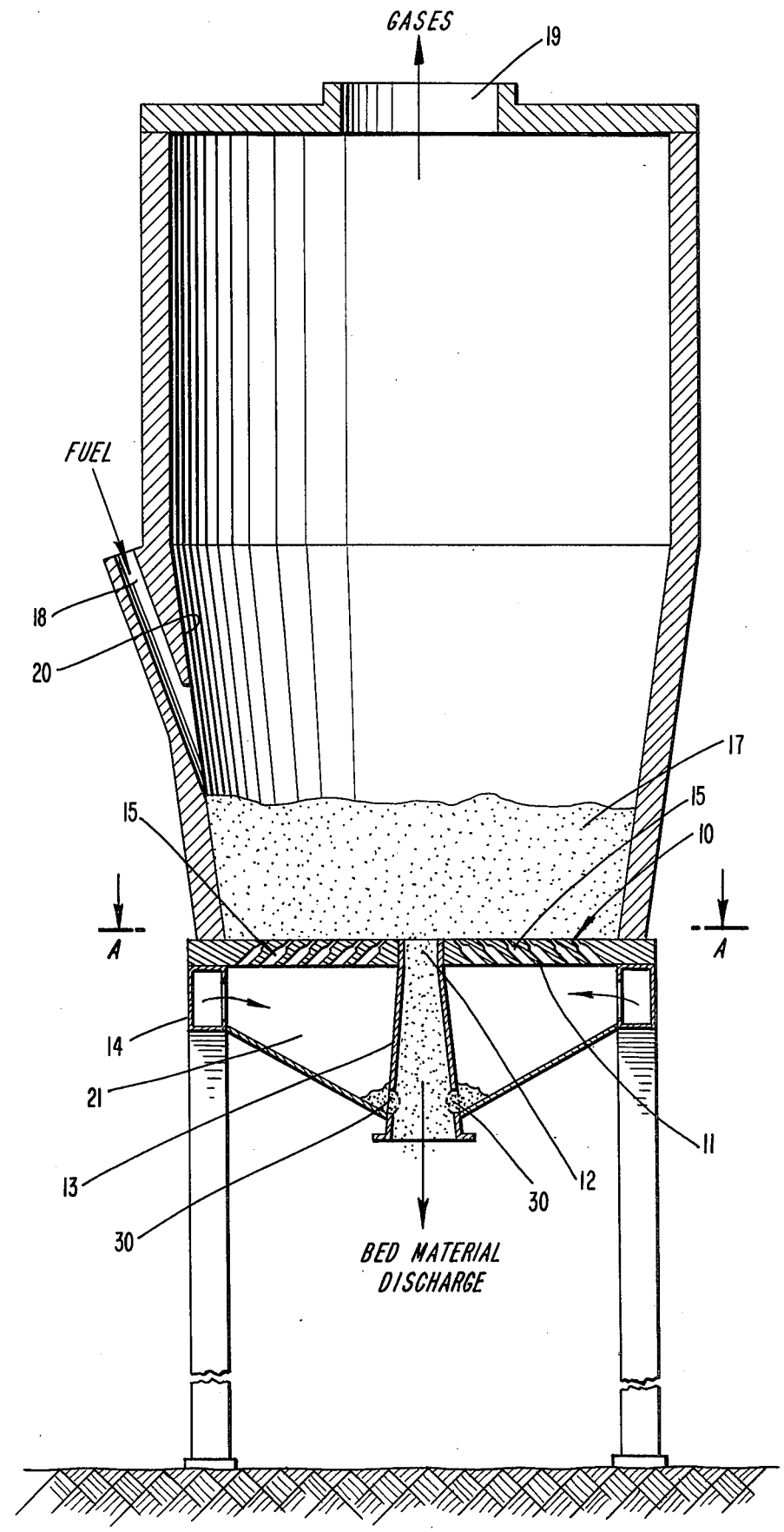

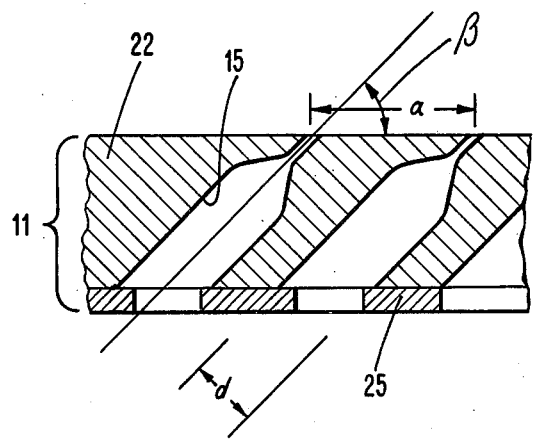
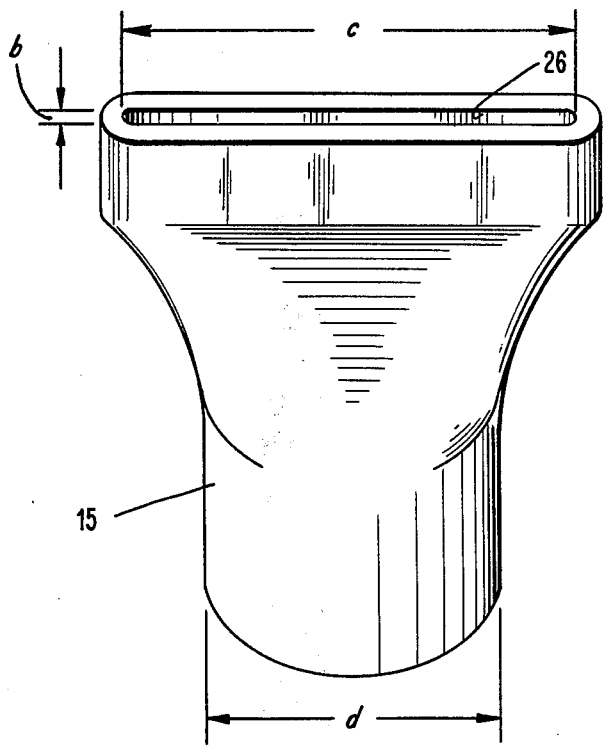
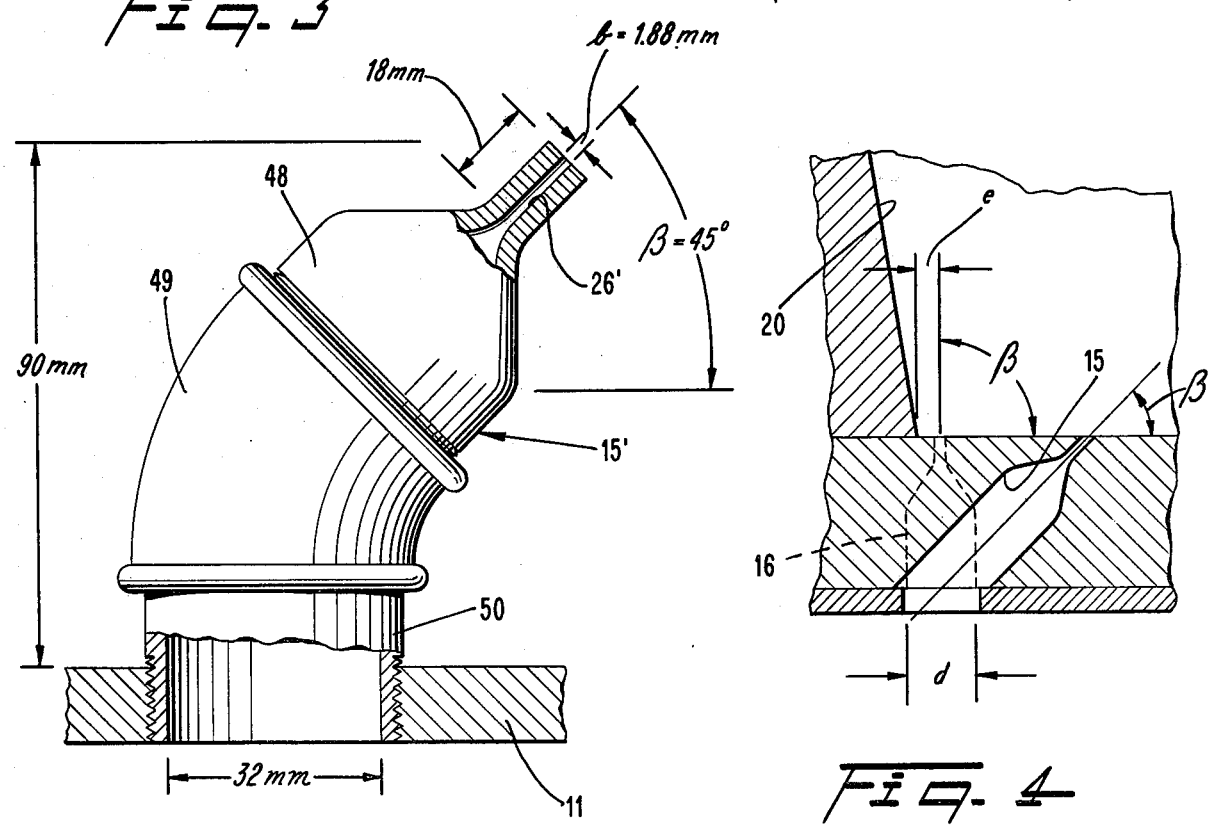

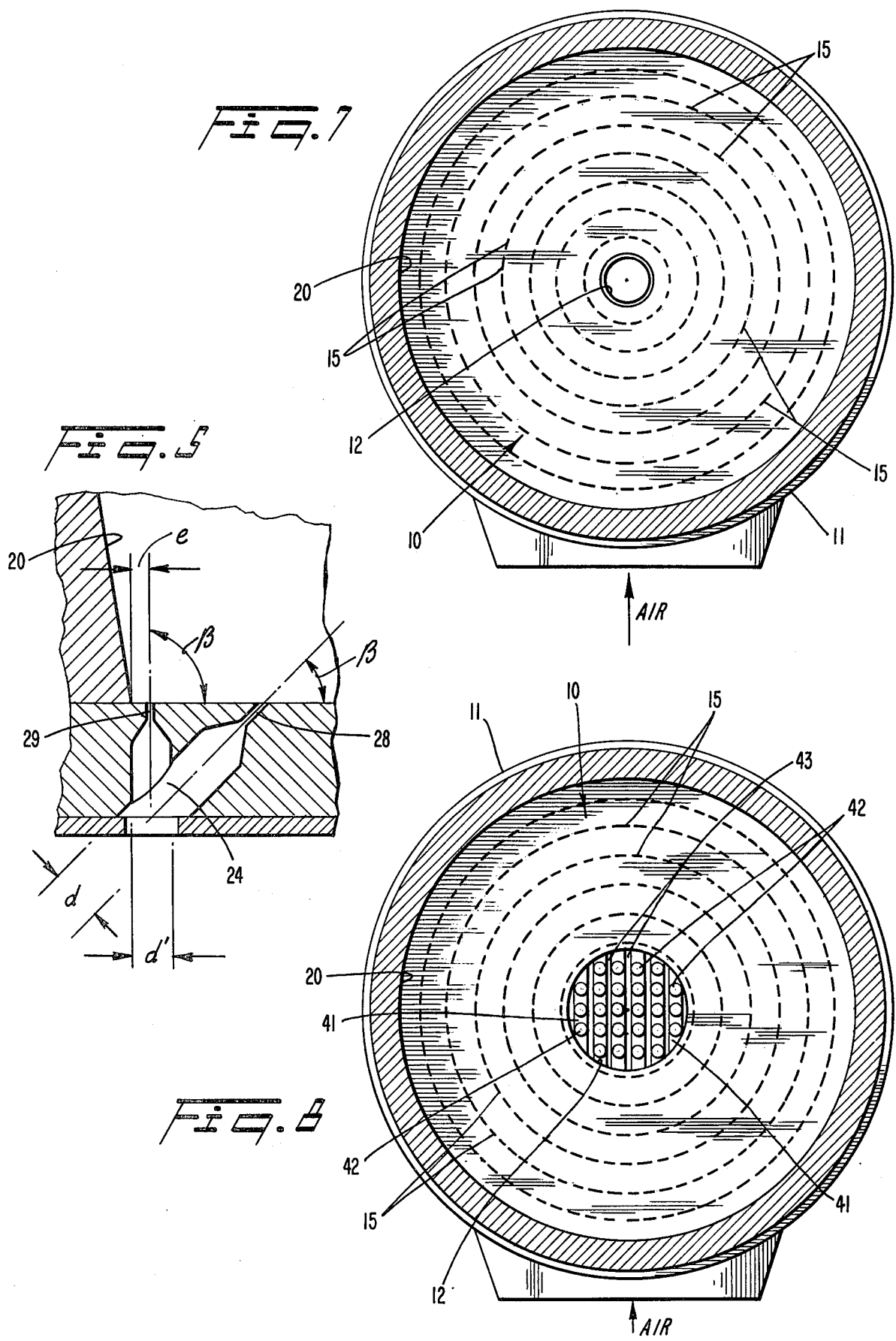

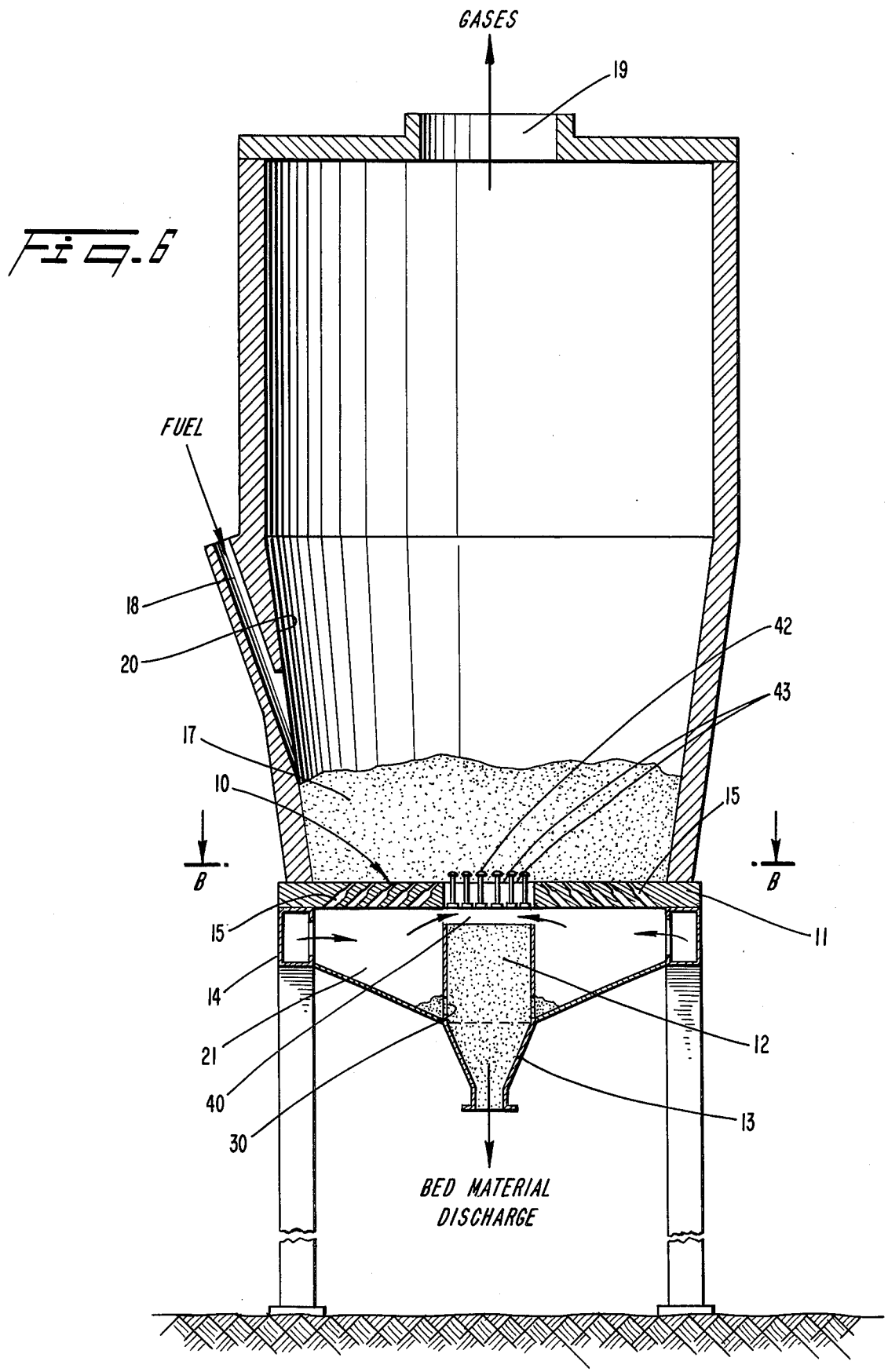

FLUIDIZED BED REACTOR UTILIZING A PLATE SUPPORT AND METHOD OF OPERATING THE REACTOR

BACKGROUND OF THE INVENTION

The present invention is directed to a fluidized bed reactor, and, more particularly, to a fluidized bed reactor utilizing a plate support for the bed through which uncombusted material is removed from the reactor and a method for operating the fluidized bed reactor.

In fluidized bed reactors for combusting particulate material, the material to be combusted is generally fed over or into a bed of granular material, usually sand. In the past, two major types of surfaces have been used to support the bed of granular material, namely, bar grates and plate grates.

A bar grate is designed to permit air or other gases to pass up through the bed and to permit refuse in the form of uncombustible tramp material and/or agglomerated material to pass through parallel spaces formed between adjacent bars and to be removed from the bottom of the reactor. In this type of grate, air is provided to a manifold that distributes the air to individual hollow bars connected to the manifold. The bars, in turn, have air nozzles that distribute the fluidizing air into the bed. An example of such a conventional bar grate is disclosed in U.S. Pat. No. 4,075,953 to Sowards, specifically in the embodiment depicted in FIG. 11 of that patent, and in U.S. Pat. No. 3,892,046 to Cooke.

A plate grate, unlike a bar grate, does not permit tramp material and/or agglomerated material to be removed from the bottom of the reactor. Instead, the plate, which is usually in the form of a flat surface, has air nozzles that distribute the fluidizing air into the bed. Air is supplied to the nozzles from an air box located below the plate. An example of such a conventional plate grate also is disclosed in U.S. Pat. No. 4,075,953, supra, specifically in the embodiment depicted in FIG. 1 of that patent, and in U.S. Pat. No. 3,907,674 to Roberts et al.

The above-discussed prior art grates have certain disadvantages that can limit the operating times of the fluidized bed. The bar grate, despite having parallel spaces between the bars through which granular material, tramp material, and/or agglomerated material can fall, tends to restrict the flow of material or to accumulate material as it passes between the parallel sides of adjacent bars. After a period of operation, the upper surface of the grate becomes covered by a static layer of tramp material and/or agglomerated material. Moreover, granular bed material tends to enter the nozzles and accumulate in the bars, which bars are difficult to clean out. As a result, the fluidization of the bed, along with the effectiveness of the reactor, decreases. Another disadvantage of the prior art bar grates is that since the bar grate extends along the entire base of the reactor, the hopper that is located below the reactor must be coextensive with the entire reactor diameter. For large diameter reactors, the cost of the required hopper can be significant.

The plate grate suffers from the severe shortcoming of having no means by which tramp material and/or agglomerated material can be removed from the entire bed during operation. Such material can only be removed by shutting down the bed.

In addition to the bar and plate grates discussed above, conical-shaped support surfaces also have been used to support a bed of granular material. In U.S. Pat. No. 4,177,742 to Uemura et al a conical-shaped support surface with a centrally disposed port is disclosed through which tramp material and/or agglomerate material is removed from the reactor. If the angle of inclination of the support surface is increased, the removal of tramp material and/or agglomerated material is facilitated. However, when the angle of inclination is increased, the height of the bed, particularly near the center of the reactor, will also increase. Consequently, the energy required to fluidize the bed increases. This is particularly significant with large diameter reactors.

SUMMARY OF THE INVENTION

In copending U.S. patent application Ser. No. 213,318, entitled FLUIDIZED BED REACTOR UTILIZING A CONICAL-SHAPED SUPPORT AND METHOD OF OPERATING THE REACTOR, filed on Dec. 5, 1980, by Jakob Korenberg, a bed support for use in a fluidized bed reactor is disclosed that comprises conduit means for removing tramp material and/or agglomerated material from the reactor, a conical-shaped support including downwardly converging surfaces terminating in the conduit means, and main air source means extending from the downwardly converging surfaces for directing pressurized air parallel to and downwardly along the surfaces toward the conduit means. The bed support disclosed in this copending application solved the problem of tramp material and/or agglomerated material build-up that can cause the shutdown of a fluidized bed combustor. Surprisingly, it has now been discovered that the problem solved by the bed support disclosed in this copending application also can be solved by a uniquely designed horizontal support surface that does not require the presence of inclined or conical surfaces.

In accordance with the present invention, a bed support for use in a fluidized bed reactor comprises a horizontal support surface, centrally disposed conduit means extending through the horizontal support surface for removing tramp material and/or agglomerated material from the reactor, and fluidizing air source means extending through the horizontal support surface having orifices directed toward the conduit means for directing pressurized air through said orifices into the bed at an acute angle to said horizontal support surface for moving the tramp material and/or agglomerated material toward the conduit means for removal from the reactor.

In the first embodiment of the bed support, the conduit means includes downwardly diverging walls extending from the horizontal support surface.

In the second embodiment of the bed support, the horizontal support surface further includes a bar grate having a plurality of spaced-apart bars positioned within the conduit means, the bars having central fluidizing air source means for distributing pressurized air to the reactor, and the conduit means includes the spaces between the bars.

The present invention also is directed to a fluidized bed reactor comprising peripheral walls forming a reactor bed, a horizontal support surface, centrally disposed conduit means extending through the horizontal support surface for removing tramp material and/or agglomerating material from the reactor, fluidizing air source means extending through the horizontal support surface having orifices directed toward the conduit means for directing pressurized air through said orifices into the bed at an acute angle to said horizontal support surface for moving the tramp material and/or agglomerated material toward the conduit means for removal from the reactor, chamber means located below the horizontal support surface and in fluid communication with the fluidizing air source means, and means to supply pressurized air to the chamber means.

In the first embodiment of the fluidized bed reactor, the conduit means includes downwardly diverging walls extending from the horizontal support surface.

In the second embodiment of the fluidized bed reactor, the horizontal support surface further includes a bar grate having a plurality of spaced-apart bars positioned within the conduit means, the bars having central fluidizing air source means in fluid communication with the chamber means for distributing pressurized air to the reactor, and the conduit means includes the spaces between the bars.

In both embodiments of the bed support and fluidized bed reactor of the present invention, the fluidizing air source means can be a plurality of jet nozzles. Preferably, the distance between adjacent jet nozzles ranges from about 100 to about 200 millimeters. It is also preferred that the jet nozzles direct pressurized air at an angle ranging from about 30° to about 60° relative to the horizontal support surface.

Also in both embodiments of the bed support and fluidized bed reactor of the present invention, the horizontal support surface further can include peripheral fluidizing air source means for directing pressurized air substantially vertically into the reactor. In connection with the fluidized bed reactor of the present invention, the peripheral fluidizing air source means is in fluid communication with the chamber means. Preferably, the peripheral fluidizing air source means also directs pressurized air into the bed at an angle for moving tramp material and/or agglomerated material toward the conduit means for removal from the reactor. The peripheral fluidizing air source means can be a plurality of jet nozzles, and it is preferred that each jet nozzle contain two orifices, one orifice directing pressurized air substantially vertically into the reactor and the other orifice directing pressurized air into the bed at an angle for moving tramp material and/or agglomerated material toward the conduit means for removal from the reactor.

In addition to the above-described bed support and fluidized bed reactor, the present invention also is directed to a method of operating a fluidized bed reactor for combusting non-uniform particulate matter, the bed including granular material and accumulated tramp material and/or agglomerated material, the method comprising providing a horizontal support surface for supporting the granular bed and the particulate matter fed into the reactor for combustion, the horizontal support surface including a plurality of jet nozzles and a centrally disposed conduit, directing pressurized air through the jet nozzles at an acute angle to the horizontal support surface both for fluidizing the bed and for moving tramp material and/or agglomerated material toward the conduit for removal from the reactor.

As previously discussed, the apparatus and method of the present invention eliminate the problem of tramp material and/or agglomerated material build-up on the support surface that is present with prior art plate grates. This is accomplished by using a horizontal support surface having a unique combination of a centrally disposed conduit means and fluidizing air source means for directing pressurized air into the bed at an acute angle for moving the materials toward the conduit means. Moreover, since the tramp material and/or agglomerated material can pass only through the conduit means, and since the conduit means constitutes only a portion of the horizontal support surface, the size and cost of the hopper located below the horizontal support surface is substantially less than the size and cost of the hopper required with the prior art bar grate supports. Finally, the bed support of the present invention is easier to manufacture and costs less to manufacture than conical-shaped support surfaces.

BRIEF DESCRIPTION OF THE DRAWINGS

FIG. 1 is a vertical sectional view of a fluidized bed reactor in accordance with a first embodiment of the invention.

FIG. 2 is a vertical sectional view of the preferred fluidizing air source means used in the present invention.

FIG. 2A is a diagrammatic view of the preferred fluidizing air source means of FIG. 2 showing the relationship between the jet nozzle orifice and jet nozzle body.

FIG. 3 is a side view of an alternative preferred fluidizing air source means used in the present invention.

FIGS. 4 and 5 are vertical sectional views of two preferred embodiments of the peripheral fluidizing air source means used in the present invention.

FIG. 6 is a vertical sectional view of a fluidized bed reactor in accordance with a second embodiment of the invention.

FIG. 7 is a horizontal sectional view on a reduced scale taken along line A—A of FIG. 1 showing a bed support in accordance with the first embodiment of the invention.

FIG. 8 is a horizontal sectional view on a reduced scale taken along line B—B of FIG. 6 showing a bed support in accordance with the second embodiment of the invention.

DESCRIPTION OF THE PREFERRED EMBODIMENTS

In order to define more specifically the present invention, reference will be made to the accompanying drawings, which are incorporated in and constitute a part of this specification and illustrate preferred embodiments of this invention.

The first embodiment of the bed support and fluidized bed reactor of the present invention is depicted in FIGS. 1 and 7. As seen in FIG. 1, the fluidized bed reactor has peripheral walls 20 that form a reactor bed in which a bed of granular material 17 is retained. The selection of the granular material will turn on the intended use of the reactor. Preferably, when the reactor is used as a combustor, the granular material is sand or other inert granular material. The material to be combusted is introduced into the reactor through inlet 18. This material can be nonuniform particulate material, such as wood waste, municipal refuse, carbonaceous material, etc. The gases generated in the reactor are removed through outlet 19.

The granular material and material to be combusted are supported by a bed support, generally referred to by the numeral 10. The bed support 10 includes a horizontal support surface 11 and a centrally disposed conduit means for removing tramp material and/or agglomerated material from the reactor.

Referring to FIG. 2, the horizontal support surface 11 preferably is a composite having a base 25 made from carbon steel. If desired, an optional refractory coating 22 can be applied which can have a thickness ranging from 80 to 100 millimeters.

As depicted in FIGS. 1 and 7, the conduit means can be a centrally disposed circular opening 12 having downwardly diverging walls 13 extending from the horizontal support surface 11. The downwardly diverging walls 13 form a hopper. As a result of the walls 13 being downwardly diverging, the tramp material and/or agglomerated material need pass only one point of contact before falling through the hopper. Consequently, the likelihood of such materials jamming between the walls 13 is minimized. Although the hopper shown in FIG. 1 is coterminous with walls 13, the present invention also contemplates the use of a hopper whose size is independent of opening 12 and walls 13.

The diameter of circular opening 12 preferably should not exceed about 8 to 10 inches. Diameters substantially in excess of this limit will adversely effect fluidization in the region above circular opening 12.

A critical feature of the present invention is the use of fluidizing air source means extending through the horizontal support surface 11 for directing pressurized air into the bed at an angle for moving the tramp material and/or agglomerated material toward the conduit means for removal from the reactor. The fluidizing air source means performs the dual function of fluidizing the bed of granular material 17 and moving the tramp material and/or agglomerated material toward the conduit means for removal from the reactor. Any type of fluidizing air source means capable of performing these dual functions can be used. Preferably, the fluidizing air source means is a plurality of jet nozzles 15. As used herein and in the accompanying claims, the term "jet nozzle" means any nozzle structure capable of producing an air velocity of at least about 60 to 120 meters/sec. It has been found that with this velocity range normal size tramp material and/or agglomerated material, e.g., 1 to 2 inch rocks, nuts, etc., can be effectively removed from the reactor. Although higher velocities will permit removal of larger size tramp material and/or agglomerated material, the higher velocities entail the use of more energy for air flow.

Referring to FIGS. 2 and 2A, the jet nozzles 15 that are preferably used in the present invention are fabricated from short metal tubes having an inside diameter "d" that can be secured to the horizontal support surface 11, such as by welding. The orifice 26 of jet nozzles 15 are formed by squeezing the upper ends of the short metal tubes. Preferably, the width "c" of orifice 26 is approximately twice as large as the inside diameter "d" of jet nozzle 15. The inside dimension "b" of orifice 26 depends upon the size of the granular bed material 17. The inside dimension "b" should be selected such that there is no noticable seepage of granular bed material 17 through jet nozzles 15. The larger the granular bed material 17, the larger can be the permissible inside dimension "b". For example, if the granular bed material 17 is malgrain having a particle size distribution of 800 to 2400 microns, the inside dimension "b" of orifice 26 can be approximately 2000 microns.

The angle $\beta$ at which the jet nozzles 15 direct pressurized air, as well as the distance "a" between adjacent jet nozzles, can vary. Preferably, the angle $\beta$ ranges from about 30° to about 60°, and the distance "a" between adjacent jet nozzles ranges from about 100 to about 200 millimeters.

An alternative jet nozzle construction, generally referred to as 15', is depicted in FIG. 3. The jet nozzle 15' has an orifice 26' formed in pipe fitting 48. Pipe fitting 50 is secured to support surface 11, and the two pipe fittings, 48 and 50, are connected by a cast elbow 49. The width "c" (not shown in FIG. 3) of orifice 26' can be 63 mm. The other dimensions of jet nozzle 15' are shown in FIG. 3. These dimensions are merely illustrative and, needless to say, other dimensions can be used.

The jet nozzle construction of FIG. 3 is particularly advantageous if overheating of the jet nozzles is expected. To the extent that overheating of the jet nozzles arises it will more likely arise where there is no refractory material between adjacent jet nozzles. If the jet nozzle orifice 26' is damaged by overheating, pipe fitting 48 can be easily replaced. However, it must recognized that the cost of jet nozzles 15' is somewhat higher than the cost of jet nozzles 15.

Referring to FIGS. 4 and 5, in accordance with the first embodiment of the bed support and fluidized bed reactor of the present invention, the horizontal support surface 11 preferably further includes peripheral fluidizing air source means for directing pressurized air substantially vertically into the reactor. The use of peripheral fluidizing air service means enhances fluidization at peripheral wall 20 of the reactor. In the embodiment depicted in FIG. 4, the peripheral fluidizing air source means preferably is jet nozzles 16. The construction of jet nozzles 16 is identical to the construction of jet nozzles 15, discussed above. However, the angle $\beta$ at which the jet nozzles 16 direct pressurized air is substantially 90°. Preferably, the distance "e" between jet nozzles 16 and the peripheral wall 20 of the reactor is approximately 2.5 to 5.0 centimeters.

An alternative preferred embodiment of the peripheral fluidizing air source means is depicted in FIG. 5. Specifically, the peripheral fluidizing air source means is a plurality of jet nozzles 24. Each jet nozzle 24 contains two orifices, 28 and 29, which are similar in construction to orifice 26 in FIG. 2A. Orifice 28, like jet nozzle 15, directs pressurized air at an angle $\beta$ preferably between about 30° and about 60°. Orifice 29, like jet nozzle 16, directs pressurized air at an angle $\beta$ of substantially 90°. As seen in FIG. 5, the inside diameter "d" is preferably less than inside diameter "d". The distance "e" between orifice 29 and the peripheral wall 20 of the reactor preferably is approximately 2.5 to 5.0 centimeters.

As seen in FIG. 1, the fluidized bed reactor in accordance with the first embodiment of the present invention preferably further includes chamber means 21 located below the horizontal support surface 11. The chamber means 21 is in fluid communication with the fluidizing air source means and the peripheral fluidizing air source means. The reactor further includes means to supply pressurized air to the chamber means 21, shown in FIG. 1 as an air plenum 14 in fluid communication with chamber means 21. Should any granular material enter chamber means 21 from the fluidizing air source means or peripheral fluidizing air source means, it can be discharged through openings 30 located in the downwardly diverging walls 13.

A demonstration fluidized bed unit in accordance with the first embodiment of the present invention (FIG. 1) was constructed having an inside diameter of 3½ feet. The unit had jet nozzles in accordance with FIGS. 2 and 2A, and peripheral fluidizing air source means. The jet nozzles had "a"=120 mm, "b"=1.88 mm, "c"=63 mm, and "d"=32 mm, and were installed at $\beta=45°$. At an air jet velocity of 90 meters/sec a pressure drop across the nozzles of 325 mm (water column) was encountered. At this air velocity removal of 2 inch rocks, washers, nuts, etc., was easily accomplished.

The second embodiment of the bed support and fluidized bed reactor of the present invention is shown in FIGS. 6 and 8. The same reference numerals as in FIG. 1 have been used to refer to the same or similar elements. The following discussion of the second embodiment primarily will be limited to the differences from the first embodiment.

Referring to FIG. 6, the bed support 10, as in the first embodiment depicted in FIG. 1, includes a horizontal support surface 11 and a centrally disposed conduit means for removing tramp material and/or agglomerated material from the reactor. Although the embodiment shown in FIG. 6 can be used with any size reactor, it is most useful for reactors having a horizontal support surface 11 exceeding approximately 8 feet in inside diameter. As seen in FIGS. 6 and 8, the conduit means is shown as a centrally disposed circular opening 12 terminating in a hopper 13. The opening 12, which can be larger than the corresponding opening shown in FIG. 1, has a diameter which is contingent upon the overall reactor size. The larger the reactor, the larger should be the diameter of opening 12 since a larger volume of tramp material and/or agglomerated material will have to pass through the opening. Although the size of hopper 13 shown in FIG. 6 is dependent upon the size of opening 12, the present invention also contemplates the use of a hopper whose size is independent of opening 12. The hopper 13 should be sufficiently large to permit tramp material and/or agglomerated material to be stored for a sufficient time to enable the material to cool before discharge.

In this second embodiment, the horizontal support surface 11 is provided with an additional element, namely, a bar grate 40 with spaced-apart bars 41, preferably oval-shaped in cross section, positioned within opening 12. The spaces 43 between bars 41 are part of the conduit means inasmuch as they are in communication with opening 12, thereby permitting tramp material and/or agglomerated material to be removed from the reactor.

The bar grate 40 has a central fluidizing air source means for distributing pressurized air to the reactor. The presence of central fluidizing air source means permits the use of a larger opening 12 than is possible with the embodiment shown in FIG. 1. As seen in FIGS. 6 and 8, the central fluidizing air source means can include nozzles 42 extending from bars 41 or jet nozzles 16 (shown in FIG. 4) extending from bars 41. Alternatively, as seen in FIG. 6B and 6C of the aforementioned copending U.S. patent application to Jakob Korenberg, instead of nozzles 42 or jet nozzles 16 the central fluidizing air source means can include orifices (referred to by numeral 44 in the copending application) located in the lower portion of bars 41. Chamber means 21 is in fluid communication with both the fluidizing air source means extending through horizontal support surface 11 and the nozzles 42 (or orifices 44 in the copending application) of bar grate 40.

The peripheral fluidizing air source means discussed in connection with the first embodiment depicted in FIGS. 1 and 7 preferably also can be used in connection with the second embodiment depicted in FIGS. 6 and 8.

In operating the fluidized bed reactor in accordance with any of the above-described embodiments, non-uniform particulate matter is introduced through opening 18. The pressurized air for fluidizing the bed is introduced through at least the fluidizing air source means (jet nozzles 15) that extend through horizontal support surface 11. The fluidizing air source means directs pressurized air at an acute angle to the surface 11 both for fluidizing the bed and for moving tramp material and/or agglomerated material toward the conduit for removal of this material from the reactor.

Although the invention has been described in the environment of combusting non-uniform particulate material, it is apparent that the apparatus and method of the invention can be used in other environments in which fluidized beds find utility.

It will be apparent to those of ordinary skill in the art that various modifications and variations can be made to the above-described embodiments without departing from the scope of the appended claims and their equivalents.

What is claimed is:

1. A bed support for use in a fluidized bed reactor comprising:
   a horizontal support surface;
   centrally disposed conduit means extending through said horizontal support surface for removing tramp material and/or agglomerated material from the reactor;
   a plurality of fluidizing air source means located throughout the area of said horizontal support surface and extending through said horizontal support surface having orifices directed radially inwardly toward said conduit means for directing pressurized air through said orifices into the bed at an acute angle to said horizontal support surface and toward said conduit means for moving said tramp material and/or agglomerated material toward said conduit means for removal from the reactor; and
   peripheral fluidizing air source means comprising a plurality of jet nozzles with each jet nozzle containing two orifices, one orifice directing pressurized air substantially vertically into the reactor and the other orifice directing pressurized air into the bed at an angle for moving said tramp material and/or agglomerated material toward said conduit means for removal from the reactor.

2. The bed support of claim 1 wherein said conduit means includes downwardly diverging walls extending from said horizontal support surface.

3. The bed support of claim 1 wherein:
   said horizontal support surface further includes a bar grate having a plurality of spaced-apart bars positioned within said conduit means, said bars having central fluidizing air source means for distributing pressurized air to said reactor; and
   said conduit means includes the spaces between said bars.

4. The bed support of claims 1, 2, or 3 wherein said fluidizing air source means is a plurality of jet nozzles.

5. The bed support of claim 4 wherein the distance between adjacent jet nozzles ranges from about 100 to about 200 millimeters.

6. The bed support of claim 5 wherein said jet nozzles direct pressurized air at an angle ranging from about 30° to about 60° relative to the horizontal support surface.

7. The bed support of claim 4 wherein said nozzles are of substantially the same size and shape.

8. The bed support of claim 4 wherein said nozzles are substantially identical.

9. The bed support system of claim 4 wherein said horizontal support surface has a uniform thickness throughout.

10. The bed support system of claim 4 wherein each of said nozzles will produce substantially the same air velocity.

11. A fluidized bed reactor comprising:
peripheral walls forming a reactor bed;
a horizontal support surface;
centrally disposed conduit means extending through said horizontal support surface for removing tramp material and/or agglomerated material from the reactor;
a plurality of fluidizing air source means located throughout the area of said horizontal support surface and extending through said horizontal support surface having orifices directed radially inwardly toward said conduit means for directing pressurized air through said orifices into the bed at an acute angle to said horizontal support surface and toward said conduit means for moving said tramp material and/or agglomerated material toward said conduit means for removal from the reactor;
chamber means located below said horizontal support surface and in fluid communication with said fluidizing air source means;
means to supply pressurized air to said chamber means; and
peripheral fluidizing air source means comprising a plurality of jet nozzles with each ject nozzle containing two orifices, one orifice directing pressurized air substantially vertically into the reactor and the other orifice directing pressurized air into the bed at an angle for moving said tramp material and/or agglomerated material toward said conduit means for removal from the reactor.

12. The fluidized bed reactor of claim 11 wherein said conduit means includes downwardly diverging walls extending from said horizontal support surface.

13. The fluidized bed reactor of claim 11 wherein:
said horizontal support surface further includes a bar grate having a plurality of spaced-apart bars positioned within said conduit means, said bars having central fluidizing air source means in fluid communication with said chamber means for distributing pressurized air to said reactor; and
said conduit means includes the spaces between said bars.

14. The fluidized bed reactor of claims 11, 12, or 13 wherein said fluidizing air source means is a plurality of jet nozzles.

15. The fluidized bed reactor of claim 14 wherein the distance between adjacent jet nozzles ranges from about 100 to about 200 millimeters.

16. The fluidized bed reactor of claim 15 wherein said jet nozzles direct pressurized air at an angle ranging from about 30° to about 60° relative to the horizontal support surface.

17. The fluidized bed reactor of claim 14 wherein said nozzles are of substantially the same size and shape.

18. The fluidized bed reactor of claim 14 wherein said nozzles are substantially identical.

19. The fluidized bed reactor of claims 14 wherein said horizontal support surface has a uniform thickness throughout.

20. The fluidized bed reactor of claim 14 wherein each of said nozzles will produce substantially the same air velocity.

* * * * *